United States Patent
Katsalis et al.

(10) Patent No.: US 11,411,824 B2
(45) Date of Patent: Aug. 9, 2022

(54) SYSTEM, FUNCTION AND INTERFACE FOR INTERCONNECTING MULTI-DOMAIN NETWORK SLICE CONTROL AND MANAGEMENT

(71) Applicant: Huawei Technologies Co., Ltd., Shenzhen (CN)

(72) Inventors: Kostas Katsalis, Munich (DE); Konstantinos Samdanis, Munich (DE); Shuping Peng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/077,065

(22) Filed: Oct. 22, 2020

(65) Prior Publication Data

US 2021/0044482 A1    Feb. 11, 2021

Related U.S. Application Data

(63) Continuation of application No. PCT/EP2018/060368, filed on Apr. 23, 2018.

(51) Int. Cl.
*H04L 41/0893* (2022.01)
*H04L 41/12* (2022.01)
*H04L 41/5009* (2022.01)

(52) U.S. Cl.
CPC .......... *H04L 41/0893* (2013.01); *H04L 41/12* (2013.01); *H04L 41/5009* (2013.01)

(58) Field of Classification Search
CPC .. H04L 41/0893; H04L 41/12; H04L 41/5009
See application file for complete search history.

(56) References Cited

U.S. PATENT DOCUMENTS

| 2017/0141973 A1 | 5/2017 | Vrzic |
| 2018/0077023 A1 | 3/2018 | Zhang |

(Continued)

FOREIGN PATENT DOCUMENTS

| CN | 107087255 A | 8/2017 |
| EP | 3273653 A1 | 1/2018 |

(Continued)

OTHER PUBLICATIONS

"3GPP TR 28.801", Jan. 2018, 3rd Generation Partnership Project, V15.1.0, pp. 1-75 (Year: 2018).*

(Continued)

*Primary Examiner* — Jonathan A Bui
(74) *Attorney, Agent, or Firm* — Conley Rose, P.C.

(57) ABSTRACT

A transport network slice subset management entity is configured to provide an NSSMF of a TN, wherein the transport network slice subset management entity is configured to receive from or send messages to a network slice management entity and to provide configuration information to entities of a transport network. A method for interfacing with a transport network slice subset management entity, comprises the steps receiving, from a request originator, a message comprising a request relating to a network slice subset instance, updating a network slice database of a transport network, according to said request and configuring an entity of a transport network according to said request. A network slice management entity configured to provide an NSMF is configured to send messages to or receive messages from a transport network slice subset management entity.

23 Claims, 6 Drawing Sheets

(56) References Cited

U.S. PATENT DOCUMENTS

| | | | | |
|---|---|---|---|---|
| 2019/0150017 A1* | 5/2019 | Yao | ........................ | H04W 16/02 |
| | | | | 370/252 |
| 2020/0008139 A1* | 1/2020 | Lai | ........................ | H04W 80/10 |
| 2020/0021487 A1* | 1/2020 | Yao | ........................... | G06F 8/65 |
| 2020/0045624 A1* | 2/2020 | Shimojou | ............. | H04W 88/14 |
| 2020/0112861 A1* | 4/2020 | Yao | ..................... | H04L 41/0893 |
| 2020/0228405 A1* | 7/2020 | Fang | .................. | H04L 41/0843 |

FOREIGN PATENT DOCUMENTS

| | | | | |
|---|---|---|---|---|
| WO | 2018032741 A1 | 2/2018 | | |
| WO | WO-2019145049 A1 * | 8/2019 | .......... | G06F 11/3452 |

OTHER PUBLICATIONS

3GPP TR 22.891 V14.2.0, "3rd Generation Partnership Project; Technical Specification Group Services and System Aspects; Feasibility Study on New Services and Markets Technology Enablers; Stage 1 (Release 14)," Sep. 2016, 95 pages.

3GPP TS 23.251 V14.1.0, "3rd Generation Partnership Project; Technical Specification Group Services and System Aspects; Network Sharing; Architecture and functional description (Release 14)," Sep. 2017, 39 pages.

3GPP TS 23.501 V15.1.0, "3rd Generation Partnership Project; Technical Specification Group Services and System Aspects; System Architecture for the 5G System; Stage 2 (Release 15)," Mar. 2018, 201 pages.

3GPP TS 23.502 V15.1.0, 3rd Generation Partnership Project; Technical Specification Group Services and System Aspects; Procedures for the 5G System; Stage 2 (Release 15), Mar. 2018, 285 pages.

3GPP TR 23.711 V14.0.0, "3rd Generation Partnership Project; Technical Specification Group Services and System Aspects; Enhancements of Dedicated Core Networks selection mechanism (Release 14)," Sep. 2016, 35 pages.

3GPP TR 23.799 V14.0.0, "3rd Generation Partnership Project; Technical Specification Group Services and System Aspects; Study on Architecture for Next Generation System (Release 14)," Dec. 2016, 522 pages.

3GPP TS 28.500 V14.1.0, "3rd Generation Partnership Project; Technical Specification Group Services and System Aspects; Telecommunication management; Management concept, architecture and requirements for mobile networks that include virtualized network functions (Release 14)," Mar. 2017, 27 pages.

3GPP TS 28.530 V0.5.1, "3rd Generation Partnership Project; Technical Specification Group Services and System Aspects; Telecommunication management; Management of 5G networks and network slicing; Concepts, use cases and requirements (Release 15)," Mar. 2018, 27 pages.

3GPP TR 28.801 V15.1.0, "3rd Generation Partnership Project; Technical Specification Group Services and System Aspects; Telecommunication management; Study on management and orchestration of network slicing for next generation network (Release 15)," Jan. 2018, 75 pages.

3GPP TR 32.842 V13.1.0, (Dec. 2015),3rd Generation Partnership Project;Technical Specification Group Services and System Aspects;Telecommunication management; Study on network management of virtualized networks (Release 13), Dec. 2015, total 84 pages.

3GPP TS 36.331 V14.6.2, "3rd Generation Partnership Project; Technical Specification Group Radio Access Network; Evolved Universal Terrestrial Radio Access (E-UTRA); Radio Resource Control (RRC); Protocol specification (Release 14)," Apr. 2018, 766 pages.

3GPP TS 36.413 V15.1.0, "3rd Generation Partnership Project; Technical Specification Group Radio Access Network; Evolved Universal Terrestrial Radio Access Network (E-UTRAN); S1 Application Protocol (S1AP) (Release 15)," Mar. 2018, 368 pages.

3GPP TS 36.423 V15.1.0, "3rd Generation Partnership Project; Technical Specification Group Radio Access Network; Evolved Universal Terrestrial Radio Access Network (E-UTRAN); X2 application protocol (X2AP) (Release 15)," Mar. 2018, 354 pages.

Hedman, P., "Description of Network Slicing Concept," NGMN 5G Project Requirements and Architecture, Work Stream E2E Architecture, Version 1.0, Jan. 13, 2016, 7 pages.

Qiang, L., et al, "Technology Independent Information Model for Network Slicing," draft-qiang-coms-netslicing-information-model-01, Oct. 30, 2017, 25 pages.

Pentikousis, K., et al, "MobileFlow: Toward Software-Defined Mobile Networks," Future Carrier Networks, IEEE Communications Magazine, Jul. 2013, 10 pages.

Wu, Q. Ed., et al, "YANG Data Model for L3VPN Service Delivery," RFC 8299, Jan. 2018, 188 pages.

"SDN architecture," Issue 1, Jun. 2014, ONF TR-502, 68 pages.

3GPP TR 28.801 V15.0.0, "3rd Generation Partnership Project; Technical Specification Group Services and System Aspects; Telecommunication management; Study on management and orchestration of network slicing for next generation network (Release 15)," Sep. 2017, 110 pages.

3GPP TS 28.531 V0.3.1, "3rd Generation Partnership Project; Technical Specification Group Services and System Aspects; Management and orchestration of networks and network slicing; Provisioning; Stage 1 (Release 15)," Mar. 2018, 19 pages.

* cited by examiner

```
+--rw nt:link* [link-id]
|  +--rw nt:link-id    link-id
|  +--rw nt:source
|  |  +--rw nt:source-node?
|  |  +--rw nt:source-tp?
|  +--rw nt:destination
|  |  +--rw nt:dest-node?
|  |  +--rw nt:dest-tp?
|  +--rw nt:supporting-link* [network-ref link-ref]
|  |  +--rw nt:network-ref
|  |  +--rw nt:link-ref
|  +--rw netslice:link-qos
|  +--rw netslice:link-bandwidth-agreement?   int64
|  +--rw netslice:link-throughput?            int64
|  +--rw netslice:link-throughput-threshold?  int64
|  +--rw netslice:link-latency-agreement?     int64
|  +--rw netslice:link-latency?               int64
```

SYSTEM, FUNCTION AND INTERFACE FOR INTERCONNECTING MULTI-DOMAIN NETWORK SLICE CONTROL AND MANAGEMENT

CROSS-REFERENCE TO RELATED APPLICATION

This is a continuation of Int'l Patent App. No. PCT/EP2018/060368 filed on Apr. 23, 2018, which is incorporated by reference.

TECHNICAL FIELD

In general, the present disclosure relates to the field of wireless communication. More specifically, the present disclosure relates to devices and methods for configuring and managing network slices.

BACKGROUND 5G wireless networking is expected to offer a communication ecosystem that enables a plethora of diverse services in a cost-effective manner facilitating network connectivity for 3rd parties that do not own a network infrastructure. A means to achieve this comes through the newly developed concept of network slicing, which allows the deployment of multiple logical, self-contained networks, offering 3rd parties and vertical tenants customized services on the top of a shared infrastructure. Network slicing is addressed end-to-end, combining the radio access network (RAN), transport network (TN) and core network as described in "NGMN, Description of the network slicing concept, 2016".

Traditionally, the combination of resources across the RAN, TN and core network is preconfigured, with a mobile network operator mapping and configuring such resources manually, e.g. a tunnel from the mobile RAN and core network, referred to as GTP tunnel, is mapped to a VPN tunnel in the transport network domain.

With this known paradigm, the dynamic requirements of network slicing, in which a 3rd party can request, configure, manage and modify the resources of a network slice on-demand e.g. as identified in "3GPP TR 28.801, Study on management and orchestration of network slicing for next generation network, Rel.15, 2017.", are hard to satisfy.

SUMMARY

It is an object to improve network resource operations, in particular on-demand network slicing, within the proposed 5G infrastructure of the mobile network and the Transport Network.

According to a first aspect, a transport network slice subset management entity is configured to provide a network slice subset management function (NSSMF) of a TN. The transport network slice subset management entity is further configured to receive from or send messages to a network slice management entity and to provide configuration information to entities of the transport network.

In this way, a message originator, in particular a network slice management entity, may advantageously gain a connection to the capabilities of the lower levels of the communication network. In particular, the message originator may access information from the transport network by intermediary of the transport network slice subset management entity, on a per network slice basis.

In a further implementation of the first aspect, the configuration information comprises at least one of capabilities exposure information of the transport network to the network slice management function (NSMF); slice configuration information; life-cycle management information. A management entity is, in particular, configured to receive capabilities exposure information and/or to send slice configuration information and/or life-cycle management information.

The management entity may be an entity providing a NSMF, in particular a network slice management entity. The message originator, in particular the network slice management entity, thus advantageously gains a global view of the state of the system for allocating resources.

In a further implementation of the first aspect, the transport network slice subset management entity is configured to store and provide information relating to network slice instances.

By means of this storage, it is possible to allocate resources based on an improved unobstructed view, allowing the underlying transport network network slice subset management entity to map the request to actual resources.

In a further implementation of the first aspect, the transport network slice subset management entity may comprise a storage device for storing information about at least one of the following properties of a transport network: a capability, in particular a function capability; a topology including at least a link; a node; an interface; a network or value added service function; a security policy and a performance parameter.

The storage device may comprise a database. This information is particularly useful to make dynamic allocation of transport network resources to network slices possible, enabling an end-to-end flexible life-cycle management of the network slice.

According to a second aspect, a method for interfacing with a transport network slice subset management entity comprises the steps, carried out by the transport network slice subset management entity, receiving, from a request originator, a message comprising a request relating to a network slice subset instance; updating a network slice database of a transport network, according to said request; and configuring an entity of a transport network according to said request.

This allows the request originator, for example a network slice management entity, to gain a connection to the capabilities of the lower level, in particular the transport network, by using information from the transport network slice subset management entity.

According to another implementation of the second aspect, the message comprises a create request relating to a network subset slice. Before updating the network slice database, the method comprises determining a type and/or quantity of resources required to execute the create request. The updating step comprises adding the determined type and/or quantity of resources to the network slice database.

Since the transport network network slice subset management entity knows which resources are available in the transport network, it can determine the correct resources required to fulfil the create request.

According to another implementation of the second aspect, the message comprises a request for allocation and/or deallocation of resources. The method then comprises the step of updating of the resources used as stored in the TN network slice database (TN-NSDB) according to said request.

The transport network network slice database allows allocation of resources based on an abstracted view which allows the transport network network slice subset management entity to perform a mapping of the request to actual resources. Furthermore, it is also possible to determine whether sufficient resources are available in the transport network to fulfil the request.

According to another implementation of the second aspect, the message comprises an information request, requesting at least one of the following: a topology information, a performance information, a functions information, in particular a network functions information, a value-added functions information or a security or a policy information. The method then comprises determining the requested information and sending, to the originator of the request, a response comprising the requested information.

Having this information at higher levels, in particular at the network slice management entity, allows the global view of the wireless network, including the radio network, the transport network, the cloud and the core network, and thus improved control over resource allocation.

According to another implementation of the second aspect, the message comprises a configure request relating to a network subset slice. The method comprises configuring resources and/or functions of a transport network based on the information stored in the network slice database.

By means of the transport network network slice database, the configure request can be immediately verified and the required resources allocated.

According to another implementation of the second aspect, the message comprises a modification request relating to a network subset slice. The method comprises configuring resources and/or functions of a transport network according to the modification request. The updating step comprises updating the information of the acquired resources in the network slice database.

When a request to modify a network subset slice is received, it can be verified and the required resources allocated by means of the transport network network slice database without further communication enquiring about capabilities of the underlying transport network.

According to another implementation of the second aspect, the method comprises sending, by the transport network network slice subset management entity, an information message to the request originator, comprising at least one of the following: a performance measurement information, a topology change information or a fault information with respect to a particular identification of one of the following: a network slice instance, a network slice subset instance, a tenant, a part of a network slice subset instance lifecycle management process, an acquisition of a network exposure.

When conditions within the transport network change, the upper layers can be informed of these changes by messages sent from the transport network network slice subset management entity. This is useful in particular when there are errors or faults within the transport network.

According to a third aspect, a network slice management entity is configured to provide an NSMF. The network slice management entity is further configured to send messages to or receive messages from a transport network slice subset management entity. The network slice management entity comprises a database configured to store and provide network management information based on the capabilities of a transport network and the network slice management entity is configured to retrieve said capabilities information from responses and/or messages received from the transport network slice subset management entity.

Advantageously, the network slice management entity gains a global view of the wireless network, including the radio network, the transport network, the cloud and the core network, from the responses to the information requests. Thus, the allocation of resources is simplified.

According to another implementation of the third aspect, the network slice management entity comprises a network slice instance database configured to store and provide information for network slice instances.

According to a fourth aspect, a network management system comprises at least one transport network slice subset management entity and at least one network slice management entity, wherein a method as described above is implemented.

According to a fifth aspect, a computer program, when executed on a computer, implements a transport network slice subset management entity and/or a network slice management entity and/or any of the methods described above.

It should be noted that the above apparatuses may be implemented based on a discrete hardware circuitry with discrete hardware components, integrated chips or arrangements of chip modules, or based on a signal processing device or chip controlled by a software routine or program stored in a memory, written on a computer-readable medium or downloaded from a network such as the internet.

It shall further be understood that an embodiment can also be any combination of the dependent claims or above embodiments with the respective independent claim.

These and other aspects will be apparent from the embodiments described below.

BRIEF DESCRIPTION OF DRAWINGS

To illustrate the technical features of embodiments more clearly, the accompanying drawings provided for describing the embodiments are introduced briefly in the following. The accompanying drawings in the following description are merely some embodiments, but modifications of these embodiments are possible without departing from the scope of the present disclosure as defined in the claims.

DETAILED DESCRIPTION

Figure 1:
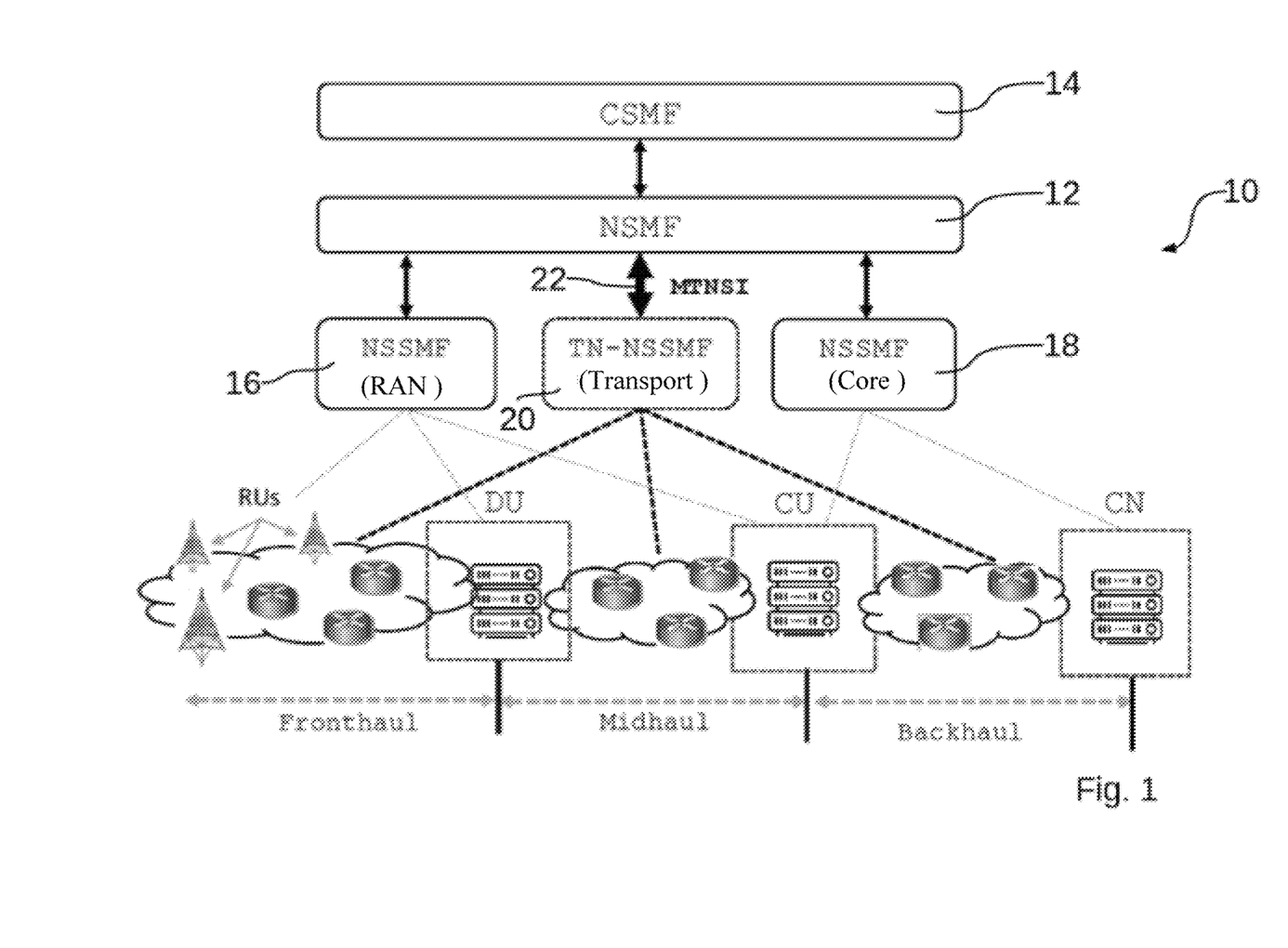
FIG. 1 shows a schematic view of a structure of a 5G wireless network with a system and devices according to an embodiment.

FIG. 1 shows a schematic view of a structure of a 5G wireless network 10 with a system and devices according to an embodiment. The 5G wireless network 10 comprises a variety of physical and virtual devices and entities that cooperate to permit operation of the network. Virtual or physical entities that provide certain predefined sets of functionalities can be referred to as functions. The physical devices and entities may be subdivided in a virtual manner to provide one or a combination of resources, network functions and services to network slices that may each provide a network with certain dynamically defined properties and characteristics.

In particular, a 5G network supporting management and orchestration for network slicing comprises a network slice management entity 12, providing a Network Slice Management Function, NSMF, which is responsible for management and orchestration of the entire Network Slice Instance, NSI, while it is the entity that is deriving specific network slice subnet related requirements. Furthermore, such a network comprises a Communication Service Management Function 14, CSMF, which is used to translate communication service requirements to network slice related requirements.

A Network Slice Instance, NSI, may operate over multiple sub-networks and for each sub-network a specific set of requirements is driving the creation of a Network Slice Sub-network Instance, NSSI. The NSSI is controlled through a corresponding Network Slice Subnet Management Function 16, 18, 20, NSSMF. The NSSMF for the Transport Network is provided by a transport network slice subset management entity 20, whereas separate NSSMFs are specified by 3GPP for a Radio Access Network, RAN and a Core Network, CN. These particular NSSMFs are referred to as RAN-NSSMF 16 and Core-NSSMF 18. 3GPP specifies the RAN-SSMF 16 and the Core-SSMF 18, while the functionality, integration and operation of the transport network slice subset management entity 20 are open to be specified.

The transport network slice subset management entity, TN-NSSMF 20 is configured to provide an NSSMF (Network Slice Subset Management Function) of a TN (Transport Network), and to receive from or send messages to a network slice management entity, NSMF 12 and provide configuration information to entities of a transport network. The TN-NSSMF 20 may further be configured to store and provide information relating to network slice instances.

The network slice management entity, NSMF 12 may be configured to provide an NSMF, and to send messages to or receive messages from the TN-NSSMF 20. The NSMF 12 may comprise a database configured to store and provide network management information based on the capabilities of a transport network and wherein the NSMF 12 is configured to retrieve said capabilities information from responses and/or messages received from the TN-NSSMF 20. To this end, the NSMF 12 may comprise a network slice instance database, NSI-DB 26 configured to store and provide information for network slice instances.

A Mobile Transport Network Slice Interface 22, MTNSI, is provided for communication between the NSMF 12 and the TN-NSSMF 20. Thus, the messages may be received from or sent to the NSMF 12 by the TN-NSSMF 20 via the MTNSI 22. FIG. 1 shows a mobile network and a TN, while highlighting the MTNSI 22, which is used for the communication between the NSMF 12 and the TN-NSSMF 20. With respect to the TN, fronthaul, midhaul and backhaul networks are used to interconnect Physical Network Functions, PNF and/or Virtualized Network Functions, VNFs and/or value added services.

MTNSI 22 is the interface used for all the communication between the 3GPP network slicing management and orchestration system and the corresponding TN slice management system. To implement the MTNSI 22, the TN-MSSF 20 is configured to communicate with the NSMF 12, in particular to receive messages from or send messages to the NSMF 12.

The NSMF 12 is further configured to provide configuration information to entities of a transport network.

The configuration information may comprise at least one of:
  capabilities exposure information of the transport network to the NSMF,
  slice configuration information,
  life-cycle management information.

In particular, the NSMF 12 is configured to receive capabilities exposure information and/or to send slice configuration information and/or life-cycle management information.

In support of network slicing configuration and life-cycle management requirements, the new interface, i.e. MTNSI 22, between the mobile network, e.g. 3GPP and the TN, may be needed to:
  Align network slicing requirements and map the network slice instance defined by 3GPP to the underlying transport topology and to the link interconnections taking into account the desired transport network performance attributes.
  Expose capabilities of the transport network performance attributes and/or connectivity, and/or functionality and/or requirements to the 3GPP mobile network.
  Design the appropriate data models.
  Maintain network slice instance state at the transport network level and use it for mapping purposes.

Main Functionalities of the MTNSI 22 may comprise the signaling of Request/Response patterns and an exposure of Capabilities from the Transport Network to the Mobile Network.

The exposure of capabilities may comprise in particular the SLA mapping from mobile to transport network, the support and/or realization of all NSI Phases for the transport network. These phases may, in particular, comprise preparation, instantiation/configuration, runtime and/or decommissioning phases. Furthermore, the exposure of capabilities should be capable of handling slice dynamicity and re-configuration procedures aligned with the mobile network.

The MTNSI 22 may further introduce integrated Network Slice Identifiers, NSIDs, which correspond to one or more transport network components, in particular for resources, network functions and/or services. Furthermore, such Identifiers may be associated with service maintenance for all the transport paths.

Figure 2:
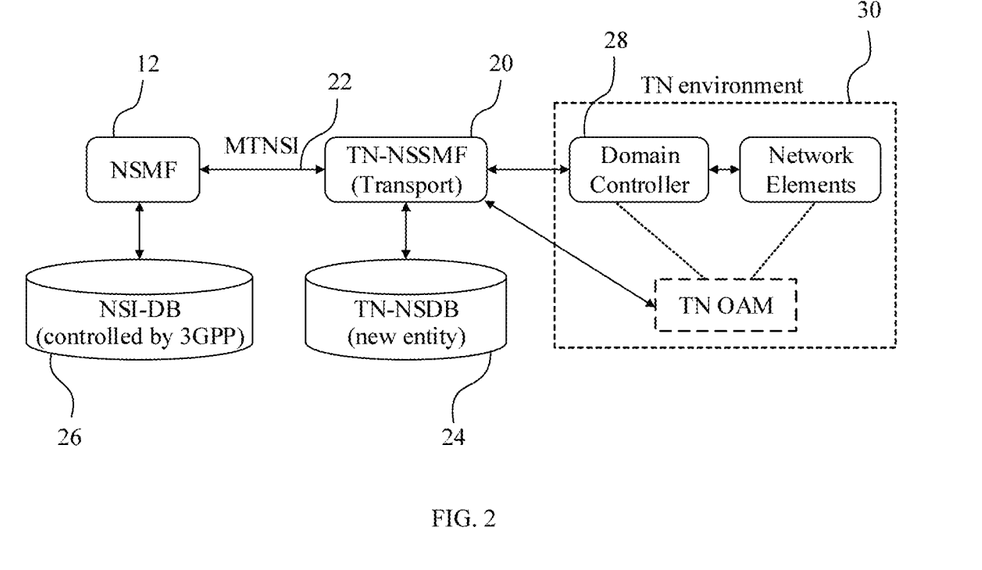
FIG. 2 shows a schematic detail view of the wireless network of FIG. 1 according to an embodiment.

To implement the MTNSI 22, as shown in FIG. 2, the TN-NSSMF 20 is configured to store and provide information relating to network slice instances. To this end, the TN-NSSMF 20 may comprise a storage device for storing information about at least one of the following properties of a transport network: a capability, a topology including at least a link, a node, an interface, a network or value added service function, a security policy and a performance parameter. This storage device may comprise a network slice database, TN-NSDB 24 that may hold a mapping, i.e. slice allocation vectors, between the mobile network and the TN. Furthermore, signaling protocols, performance attributes, a resource model and messages for communicating the mapping between the mobile network and the TN should be defined for the MTNSI 22.

FIG. 2 shows a high-level representation of the management and orchestration system architecture. The following entities may be used to implement the MTNSI 22:
  The TN-NSSMF 20 may be responsible for the orchestration and management of one or more TN-NSSI entities of the Transport Network as well as for providing TN OAM information per slice or tenant to the mobile network that resides on top via the NSMF 12 by consulting the network slice database 24 for identifying the resources, functions, etc. per slice.

The MTNSI 22 may be the interface for all the messaging between TN-NSSMF 20 and the NSMF 12 for all the processes that support the NSI phases.

The network slice information database 26, NSI-DB, may be a database that maintains all the NSI information for the mobile network, i.e. 3GPP.

The transport network's network slice database 24, TN-NSDB, may be a database that maintains the NSSIs' slice information in the TN. The information stored consists of identification and mappings between the network slice of the mobile network and the one of the TN, including network slice resources, network functions, configurations, etc.

A Domain Controller 28 may be a logical entity responsible for the control plane functionalities for the TN, e.g. a Software Defined Network, SDN, controller can be used for realizing the TN Domain Controller 28.

A Transport Network 30, TN, environment: the environment of operation for TN, e.g. wavelength-division multiplexing (WDM), optical transport network (OTN), Flex-Ethernet, multiprotocol label switching (MPLS) etc.

The identification of NSIs, TN-NSSIs, TN-resources, TN-network functions, TN-interfaces etc. is relevant for the NSMF and TN-NSSMF integration to provide end-to-end Network Slice Information NSI. In particular, the definition of all the messages that are passed through the MTNSI should have a specific structure of elements and sub-elements together with their data types. For example, an identification of a network slice subset instance, NSSI_ID, could be represented by an integer or a universally-unique identifier (UUID) value. The status of the NSSI or the NSSI start time could be represented as e.g. an XML schema definition like the following:

<xsd:element nssi_status="active" type="xsd:boolean"/>
and
<xsd:element nssi_start time="StartTime" type="xsd:dateTime"/>

The corresponding 5G Radio Access Network, RAN, and Core slices may for example be identified using similar standardized identifiers like the following:

NeS_ID: each network slice instance is associated with a network slice type ID called NeS_ID, which is used to identify the type of the slice. Both standardized and Public Land Mobile Network, PLMN, specific values for NeS_ID are possible.

Tenant_ID: identifier of the tenant which represents an organization, agency or business entity that is entitled to access the agreed service based on predefined Service Level Agreement, SLA.

For the TN-NSSI, which assembles the end-to-end Network Slice Instance, NSI, we assume that a similar identification mechanism exists that assigns, for example, a (TN) NSSI_ID and maps it to the NSI_ID which is, e.g., provided by the NSMF 12. Depending on the approach and the TN environment considered, technology agnostic and technology specific parts may exist, wherein each may have their proper identification mechanism. As an example, we consider three categories of ids for the TN:

Category I: ids related to the NSSI lifecycle;
Category II: ids for technology agnostic network exposure (e.g. node_1, link_5); and
Category III: ids for technology specific network exposure, e.g. ATMChannelTerminationPointid and virtual-ChannelId for ATM Channel Termination Points. Similarly, the YANG Data Model for L3VPN Service Delivery as defined in "S. Litkowski, et al., 'YANG Data Model for L3VPN Service Delivery', IETF RFC 8299, 2017."

Figure 3:
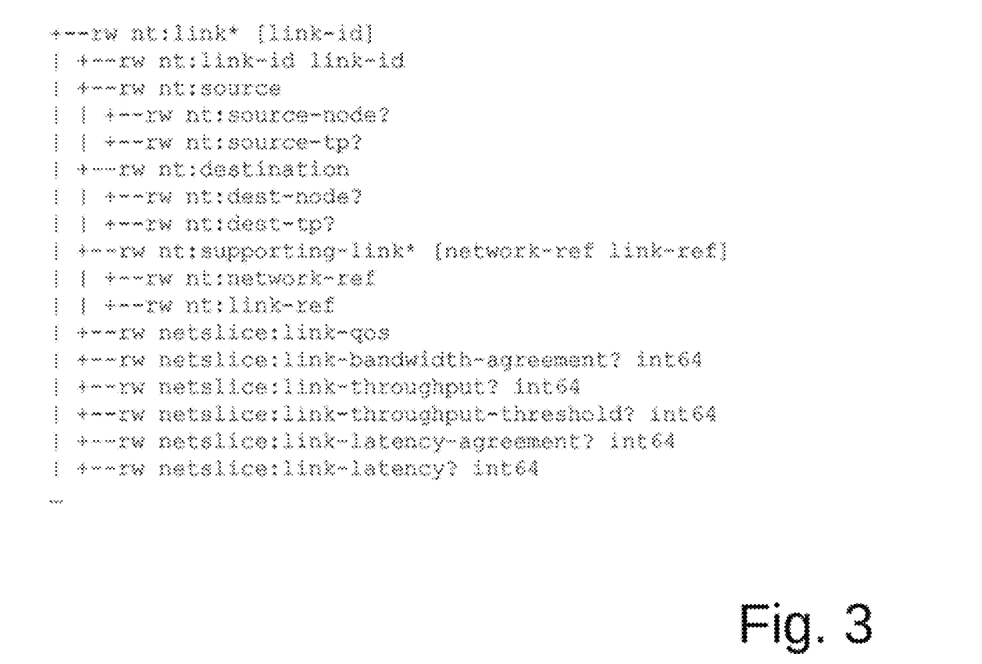
FIG. 3 shows a schematic list of properties of a link within the wireless network.

In the process of specifying the MTNSI 22 message definition, this disclosure also exploits the work in "L. Qiang, et al., 'Technology Independent Information Model for Network Slicing', IETF Draft, 2017", which provides the only relevant identification modeling currently available. That document provides technology independent information models for network slicing, as for example, the YANG Data Model. For example, a Network slice's resources comprise nodes, links, compute units and storage units, and a network-id attribute will be represented as an NSI_ID. An example of such a link model is depicted in FIG. 3. Details on the identification are however out of the scope of this disclosure and we just consider they are in place to facilitate the message passing. We consider that the way identification information is made is local to the TN environment 30 and is only exposed by the TN-NSSMF 20 to the NSMF 12 through the MTNSI 22. We also assume that for the TN-NSSI all the relevant information is stored in the TN-NSDB 24, where, depending on the data types for each element, the appropriate database table structures are used. The MTNSI 22 interface acts as a northbound interface for the TN-NSSMF 20, enabling the mobile network or other 3rd parties or service providers, etc. to efficiently operate TN network slices.

To implement the MTNSI 22, the transport network slice subset management entity TN-NSSMF 20 may implement the steps of receiving, from a request originator, a message comprising a request relating to a network slice subset instance, updating a network slice database of a transport network, according to said request and of configuring an entity of a transport network according to said request.

The message may comprise a create request relating to a network subset. In this case the TN-NSSMF 20 may determine a type and/or quantity of resources required to execute the create request. The updating step may also comprise adding the determined type and/or quantity of resources to the network slice database in this case.

If the message comprises a request for allocation and/or deallocation of resources, the TN-NSSMF 20 may update the resources used as stored in the network slice database TN-NSDB 24 according to the request.

The message may comprise an information request, requesting at least one of the following: a topology information, a performance information, a functions information or a security or a policy information. In this case, the TN-NSSMF may determine the requested information and send, to the originator of the request, a response comprising the requested information.

The message may comprise a configure request relating to a network subset slice. In this case, the TN-NSSMF 20 may configure resources and/or functions of a transport network based on the information stored in the network slice database 24.

The message may comprise a modification request relating to a network subset slice. In this case, the TN-NSSMF 20 may configure resources and/or functions of a transport network according to the modification request. Also, the updating step may comprise updating the information of the acquired resources in the network slice database 24.

The TN-NSSMF 20 may send an information message to the request originator, comprising at least one of the following: a performance measurement information, a topology change information or a fault information with respect to a particular identification of one of the following: a network slice instance, a network slice subset instance, a tenant, a part of a network slice subset instance lifecycle management process or an acquisition of a network exposure.

As an example part of an implementation of the MTNSI 22, the NSMF 12 may initiate a connection between the NSMF 12 and the TN-NSSMF 20, applying a number of parameters that need to be configured in advance like an IP address and port, and a transport protocol to use, for example TLS or TCP. A REST interface may be exposed by the TN-NSSMF 20, in which case the communication can be, for example, over https. For the initial connection establishment, the maintenance and the termination of the connection between the NSMF 12 and the TN-NSSMF 20, specific messages are exchanged. For an example version of the MTNSI 22, we consider that the relevant protocol will operate over a synchronous point-to-point communication; however all possible modes of communication may be considered, for example publish/subscribe, multipoint-to-multipoint communication, synchronous, asynchronous and so on. Regarding authentication and encryption, TLS/SSL cryptography can be used to protect the data integrity on the transport channel. Regarding authorization we assume, in this example, that this is handled by a TN-NSSMF 20 function.

For all the communication patterns necessary, we assume, in this example, that an event-driven mechanism exists where events in the NSMF 12 and the TN-NSSMF 20 are generated in at least two ways: a) automatic generation of events (periodic or aperiodic) and b) on-demand generation of events. Every event may generate a message that is sent through the MTNSI 22. Issues like fragmentation and re-assembly of messages, acknowledgements, packet errors, flow control and routing are handled by lower layers of the protocol stack and are out of scope. The MTNSI 22 should support messaging for the following categories:

| Message Category | Description |
| --- | --- |
| Category A | TN-NSSI lifecycle management and TN-NSSI state transitions: e.g., NSSI Creation, Activation, De-activation, Termination, and Modification. |
| Category B | NSSI Monitoring-Supervising |
| Category C | TN Capabilities exposure and TN-subnetwork status |
| Category D | Error handling and fault management |
| Category E | Connection management |

Category A (TN-NSSI Lifecycle Management and TN-NSSI State Transitions)

TN-NSSI Phases: For each NSI, the following phases have been defined in "3GPP TR 28.801, Study on management and orchestration of network slicing for next generation network, Rel.15, 2017." regarding the network slice lifecycle: Preparation, Instantiation, Configuration and Activation phase, Run-time and Decommissioning. The same phases may also exist for the TN-NSSI counterpart that is controlled by the TN-NSSMF 20:

Preparation: includes the provisioning of resources and services while also the creation of the network slice template(s).

Instantiation, Configuration and Activation phase: all resources shared/dedicated to the NSSI have been created and are configured and drive the system to a state where the NSSI is ready for operation. This phase also considers scheduling, i.e. the initiation time, duration, periodicity, etc.

Run-time phase: TN-NSSI is in active state, monitoring and reporting are enabled and NSI modification actions can be performed like reconfiguration or scaling.

Decommissioning phase: the TN-NSSI is deactivated and the relevant resources and services are released.

NSI States and transitions: A NSI can be either in Active or Inactive state. In inactive state, the NSI is associated with the relevant NSSIs and is ready to be activated. In Active state, the NSI is associated with the relevant NSSIs and all the associated NSSIs are active. Transitions between NSI states are made by the NSMF 12.

Similarly, each TN-NSSI can be either in Active or Inactive state, while the relevant transitions are Create, Activate, Deactivate and Terminate. It is the responsibility of the NSSMF 20 to decide when it is appropriate and safe to perform an NSSI state transition:

Create: A new TN-NSSI identifier is allocated and an initial configuration of the TN-NSSI is created. According to this configuration, new NSSIs may be created or existing NSSIs and be associated with the NSI.

Activate: The associated TN-NSSIs are activated.

Deactivate: The associated TN-NSSIs are deactivated (if they are not shared with another active NSI).

Terminate: Associations to TN-NSSIs are released and the NSI identifier is deallocated.

Additional messaging may be supported by the MTNSI 22:

TN Network slice subnet configuration management
TN Network slice subnet automated optimization
TN Network slice subnet automated healing Category B (TN-NSSI Monitoring-Supervising)

This category is related to the performance monitoring of the TN-NSSIs. Periodic reports or on-demand requests regarding the resource performance and SLA/QoS compliance are sent to the NSMF 12 through the MTNSI 22. Besides network monitoring measures, e.g. latency and throughput, other metrics like NSSI uptime, availability, reliability and responsiveness are also considered. An integrated OAM system that exposes all the necessary information may also be provided.

Category C (TN-Capabilities Exposure)

This category is used for the TN capabilities exposure to the 3GPP NSMF 12 prior to the NSI creation. Capabilities exposure is related to information like network topology, capacity, latency, delay, max throughput, resources availability, data plane technologies, interfaces available. Regarding topology information TN-NSSMF 20 may expose for example physical or virtual topologies availability in peer-to-peer or mesh and coverage (building, region, etc.). Data plane information could be technology agnostic or technology specific e.g. 100 Gbps link and/or 100 Gbps link Ethernet over SDH, deterministic (like circuit-based) or virtual (shared) links description, fronthaul capabilities (for example support for eCPRI). This list is not exhaustive and also depends on the domain control plane operation and functionalities available. Through MTNSI 22 the current transport network availability/utilization information should be also available to the NSMF 12 in order to facilitate the NSI template creation.

Category D (Error Handling and Fault Management)

A number of error conditions can be raised, regarding communication errors, NSMF 12 or TN-NSSMF 20 software errors, NSI or NSSI state errors and so on. Error conditions may exist on both the 3GPP side for the RAN or the CORE and the TN side, where in both cases error reporting is made through the MTNSI 22 interface. We assume that both the NSMF 12 and the TN-NSSMF 20 define error control and recovery procedures, including fault tolerance features and error-handling capabilities while the error reporting is made through generic error messages.

MTNSI 22 Messaging Details: Regarding the syntax of the messages for both the notification/alarms and requests/responses crossing the interface, the disclosure targets more on the procedures, the semantics and their meaning rather than the syntax details. Syntax details and formal message specification are highly relevant to the NSI templates and the identification mechanism in place.

Figure 4:
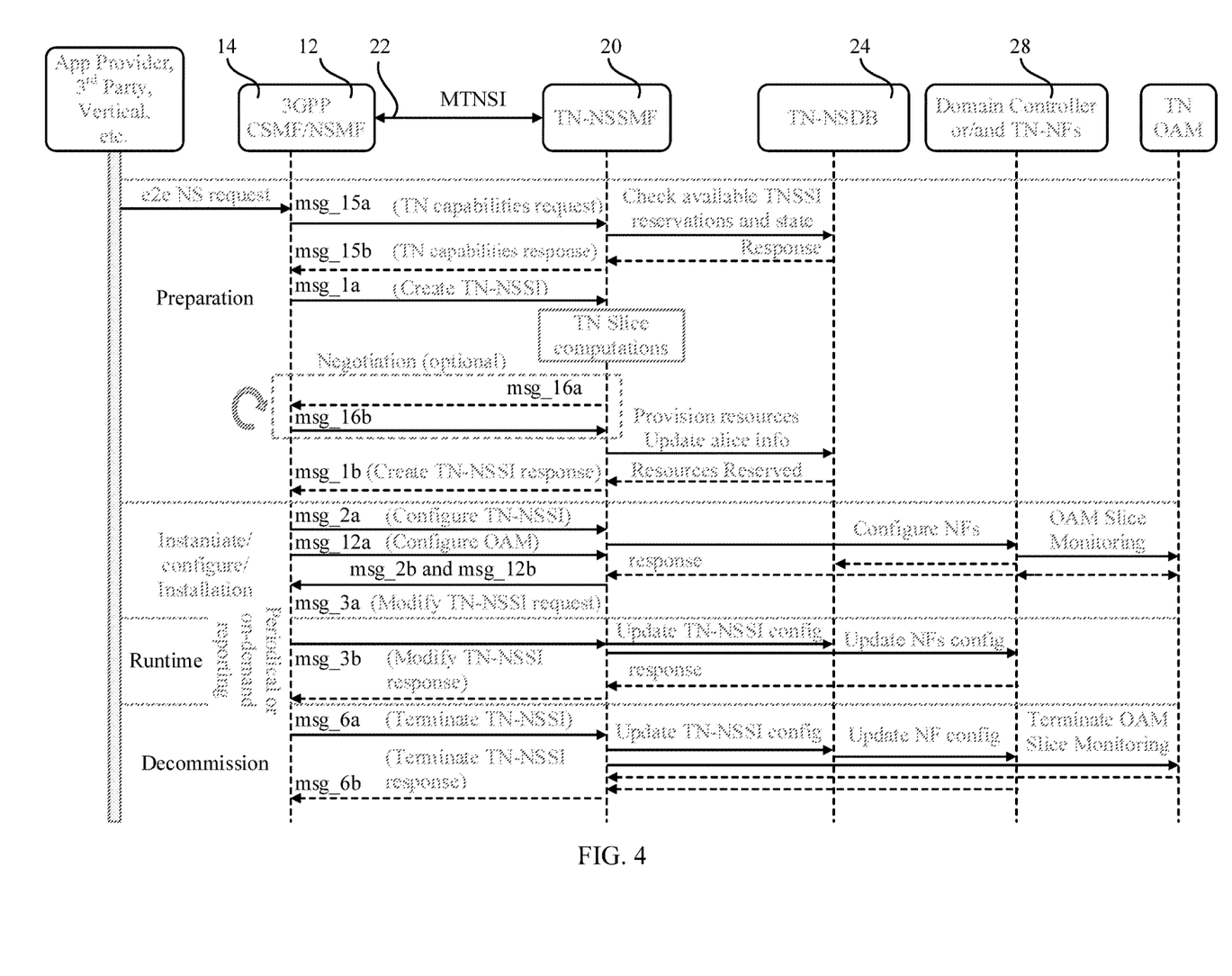
FIG. 4 shows a schematic protocol sequence according to an embodiment.

The MTSNI 22 abstract message specification is defined as follows:

functionalities. For example, as depicted in FIG. 4, an NSSI create request follows a TN capabilities request. We also highlight that inside the TN network a message to TN-NSSMF 20 can trigger a series of interactions with the TN-NSDB 24 and the domain controllers 28 who are actually performing the control of the network resources.

Besides the resource provisioning made just before the enforcement of specific configuration, TN-NSSMF 20 is responsible to perform the necessary TN slice path computations, admission control, preemption actions etc. An optional negotiation process can be also in effect in order to handle cases where the TN-NSSMF 20 is not able to provide the resources and services requested.

Figure 5:
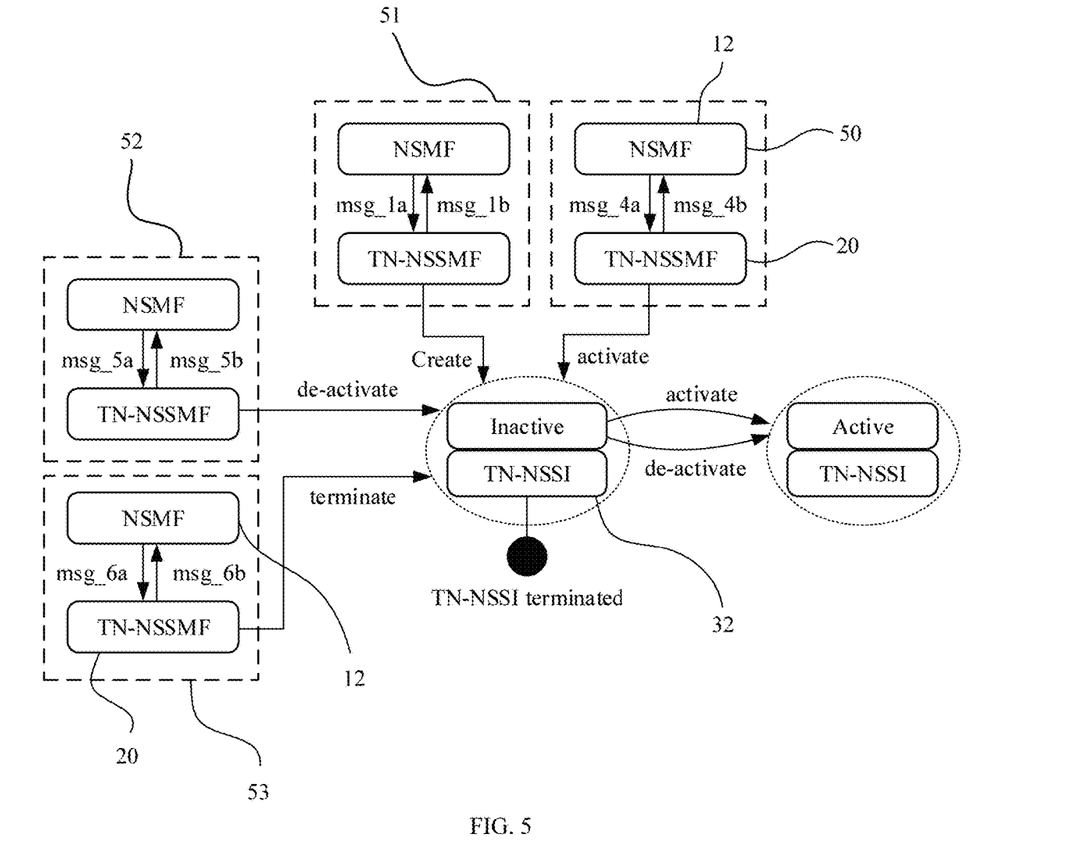
FIG. 5 shows a state diagram of a network slice lifecycle according to an embodiment.

More details on the messaging for the creation/activation/de-activation/termination of the TN-NSSI 32 are presented in FIG. 5. In principle, a TN-NSSI 32 must be first created and then activated and also de-activated before being terminated. Note that activation and de-activation actions can be made also during runtime depending on the network conditions.

As an example, in a first step 50, the transport network's network slice sub-network instance TN-NSSI 32 may be

| Category | Message Identifier | Description |
|---|---|---|
| A | msg_1a (request by NSMF 12), msg_1b (reply by TN-NSSMF 20) | Create an TN-NSSI (shared or not) |
| A | msg_2a (request by NSMF 12) msg_2b (reply by TN-NSSMF 20) | Configure a TN-NSSI |
| A | msg_3a (request by NSMF 12) msg_3b (reply by TN-NSSMF 20) | Modify a TN-NSSI |
| A | msg_4a (request by NSMF 12) msg_4b (reply by TN-NSSMF 20) | Activate a TN-NSSI |
| A | msg_5a (request by NSMF 12) msg_5b (reply by TN-NSSMF 20) | De-activate a TN-NSSI |
| A | msg_6a (request by NSMF 12) msg_6b (reply by TN-NSSMF 20) | Terminate an TN-NSSI (shared or not) |
| A | msg_7a (request by NSMF 12) msg_7b (reply by TN-NSSMF 20) | Push Policies for automated optimization of a TN-NSSI. |
| A | msg_8a (request by NSMF 12) msg_8b (reply by TN-NSSMF 20) | Show TN-NSSI state information |
| A | msg_9a (request by NSMF 12) msg_9b (reply by TN-NSSMF 20) | List NSSIs for a NSI |
| B | msg_10 (alarm by TN-NSSMF 20) | Notifications/alarm data of a TN-NSSI |
| B | msg_11 (alarm by NSMF 12) | Notifications/alarm data of a NSI |
| B | msg_12a (send by TN-NSSMF 20) msg_12b (reply by NSMF 12) | Configure monitoring the performance of an NSSI |
| B | msg_13a (send by TN-NSSMF 20) msg_13b (reply by NSMF 12) | TN-NSSI performance measurement data. |
| B | msg_14a (request by NSMF 12) msg_14b (reply by TN-NSSMF 20) | TN-NF performance measurement data. |
| C | msg_15a (request by NSMF 12) msg_15b (reply by TN-NSSMF 20) | TN capabilities and availability exposure |
| C | msg_16a (request by TN-NSSMF 20) msg_16b (reply by NSMF 12) | TN negotiation |
| D | msg_17a (request by NSMF 12) msg_17b (reply by TN-NSSMF 20) | Error messages for the TN |
| D | msg_18a (request by NSMF 12) msg_18b (reply by TN-NSSMF 20) | Error messages for a TN-NSSI |
| E | msg_19a (request by NSMF 12) msg_19b (reply by TN-NSSMF 20) | Establish NSMF 12 and TN-NSSMF 20 communication |
| E | msg_20a (request by NSMF 12) msg_20b (reply by TN-NSSMF 20) | Terminate NSMF 12 and TN-NSSMF 20 communication |
| E | msg_21a (request by NSMF 12) msg_21b (reply by TN-NSSMF 20) | Keep-alive messages (NSMF 12 and TN-NSSMF 20 communication) |
| E | msg_22a (request by NSMF 12) msg_22b (reply by TN-NSSMF 20) | Show TN-NSSMF 20 information |

An example for a protocol embodiment of the MTNSI 22 interface considers the sequences of interactions over the interface. For each NSI/NSSI phase a set of messages through MTNSI 22 can be exploited to support the necessary activated by the associated TN-NSSMF 20. This activating step may be triggered by the reception of a message of type msg_4a by the TN-NSSMF 20. When the activation step is completed, the TN-NSSMF 20 sends a message of type msg_4b back to the NSMF 12. The message of type msg_4b may comprise an error code if the activation was not successful.

In a further step 51, the TN-NSSI 32 may receive a create message of type msg_1a to create a network slice sub-network instance. This would cause the TN-NSSMF 20 to create the TN-NSSI 32. A message of type msg_1b may then be sent back to the NSMF 12. This message of type msg_1b may indicate to the NSMF 12 whether the create action was successful.

In a further step 52, the TN-NSSI 32 may receive a de-activate message of type msg_5a to deactivate a network slice sub-network instance. This would cause the TN-NSSMF 20 to deactivate the TN-NSSI 32. A message of type msg_5b may then be sent back to the NSMF 12. This message of type msg_5b may indicate to the NSMF 12 whether the deactivate action was successful.

In a further step 53, the TN-NSSI 32 may receive a terminate message of type msg_6a to terminate a network slice sub-network instance. This would cause the TN-NSSMF 20 to terminate the TN-NSSI 32. A message of type msg_6b may then be sent back to the NSMF 12. This message of type msg_6b may indicate to the NSMF 12 whether the terminate action was successful.

Of course, any type of message that conveys these requests and/or orders may be used for communication between the NSMF 12 and the TN-NSSMF 20. The TN-NSSMF 20 and the NSMF 12 may each be, but do not need to be, the same entity for all the steps 50 to 53.

Two example embodiments of messages are described below. Each message may have preconditions which need to be fulfilled before the message is invoked. Furthermore, each message may have post-conditions describing the state of the MTNSI 22 and/or the NSMF 12 and/or the TN-NSSMF 20 after the message has been handled.

Example Embodiment: Message Specification for Capabilities Exposure

The following message specification is a statement of what is made known about capabilities exposure. A resource element is exposed to other entities like NSMF 12 to interact or communicate with it.

The service provided by this message is a Capabilities Exposure of the TN network (msg_15a). Preconditions for this message exchange include:

The TN-NSSMF is operational and integrated with the TN-NSDB and the domain control mechanisms.

The communication channel between the NSMF and the TN-NSSMF is operational.

TN-NSDB holds all the state information for all the TN-NSSIs.

TN-NSDB holds all the resource reservations for all the TN-NSSIs.

A TN-NSSI create/activate/de-activate/terminate operation is not in progress.

Post-conditions for this message include:

No change has occurred in any TN-NSSIs.

The NSMF has been notified of the capabilities of the TN and the available resources.

This example embodiment for a message may be described in xsd format as follows:

```
<?xml version="1.0"?>
<xs:schema xmlns:xs="http://www.huawei.com/temp"
targetNamespace="http://www.huawei.com/temp_namespace"
xmlns="http://www.huawei.com/temp_namespace">
<xs:element name="hard_pipe_slicing"/>
<xs:complexType>
    <xs:attribute name="support" type="xs:boolean" />
    <xs:sequence>
    <xs:element name="flexe_support" type="xs:boolean"/>
    <xs:element name="wdm_support" type="xs:boolean"/>
        ...
      <xs:sequence>
<xs:complexType>
<xs:element name="soft_pipe_slicing"/>
<xs:complexType>
    <xs:attribute name="support" type="xs:boolean" />
    <xs:sequence>
<xs:element name="l2vpn_support" type="xs:boolean"/>
<xs:element name="l3vpn_support" type="xs:boolean"/>
...
    <xs:sequence>
<xs:complexType>
<xs:element name="segment_routing_support" type="xs:boolean"/>
<xs:complexType>
    <xs:attribute name="support" type="xs:boolean" />
<xs:complexType>
<xs:element name="performance">
    <xs:complexType>
        <xs:sequence>
            <xs:element name="max_latency" type="xs:decimal"/>
            <xs:element name="min_bandwidth" type="xs:decimal"/>
                <xs:element name="max_bandwidth" type="xs:decimal"/>
                <xs:element name="max_jitter" type="xs:decimal"/>
                <xs:element name="packet_loss_probability" type="xs:decimal"/>
        </xs:sequence>
    </xs:complexType>
</xs:element>
</xs:schema>
```

Example Embodiment: Message Specification for Transport Network Slice Request The following message specification is a statement of how a network slice request may be defined. The Service provided by this message is that the NSMF 12 requests Transport Network resources for a new network slice (msg_1a). Preconditions for the invocation of this message include:
  The TN-NSSMF is operational and integrated with the TN-NSDB and the domain control mechanisms.
  The communication channel between the NSMF and the TN-NSSMF is operational.
  TN-NSDB holds all the state information for all the TN-NSSIs.
  TN-NSDB holds all the resource reservations for all the TN-NSSIs.
  A TN-NSSI create/activate/de-activate/terminate operation is not in progress.
  Post-conditions for this message include:
  A new TN-NSSIs is created.
  The NSMF has been notified.

This example embodiment for a message may be described in xsd format as follows:

```
<?xml version="1.0"?>
<xs:schema xmlns:xs="http://www.huawei.com/temp"
targetNamespace="http://www.huawei.com/temp_namespace"
xmlns="http://www.huawei.com/temp_namespace">
<xs:element name="nssi_request"/>
<xs:complexType>
    <xs:sequence>
    <xsd:element slice_id: int type="xsd:integer"/>
    <xsd:element slice_duration="duration" type="xsd:double"/>
    <xsd:element slice_init_time="StartTime" type="xsd:dateTime"/>
    <xsd:element slice_police="slice_policy" type="xsd:slice_policy"/>
    <xsd:element nssi_start_time="StartTime" type="xsd:dateTime"/>
        <xs:element name="hard_slice_support"/>
            </xs:complexType>
<xs:attribute name="support" type="xs:boolean" />
<xs:attribute name="type" type="xs:enumeration" />
    </xs:complexType>
    <xs:element name="soft_slice_support"/>
    </xs:complexType>
<xs:attribute name="support" type="xs:boolean" />
<xs:attribute name="type" type="xs:enumeration" />
    </xs:complexType>
    <xs:element name="performance">
    <xs:complexType>
<xs:sequence>
    <xs:element name="max_latency" type="xs:decimal"/>
    <xs:element name="min_bandwidth" type="xs:decimal"/>
    <xs:element name="max_bandwidth" type="xs:decimal"/>
    <xs:element name="max_jitter" type="xs:decimal"/>
    <xs:element name="packet_loss_probability" type="xs:decimal"/>
</xs:sequence>
    </xs:complexType>
    </xs:element>
<xs:sequence>
<xs:complexType>
</xs:schema>
```

Figure 6:
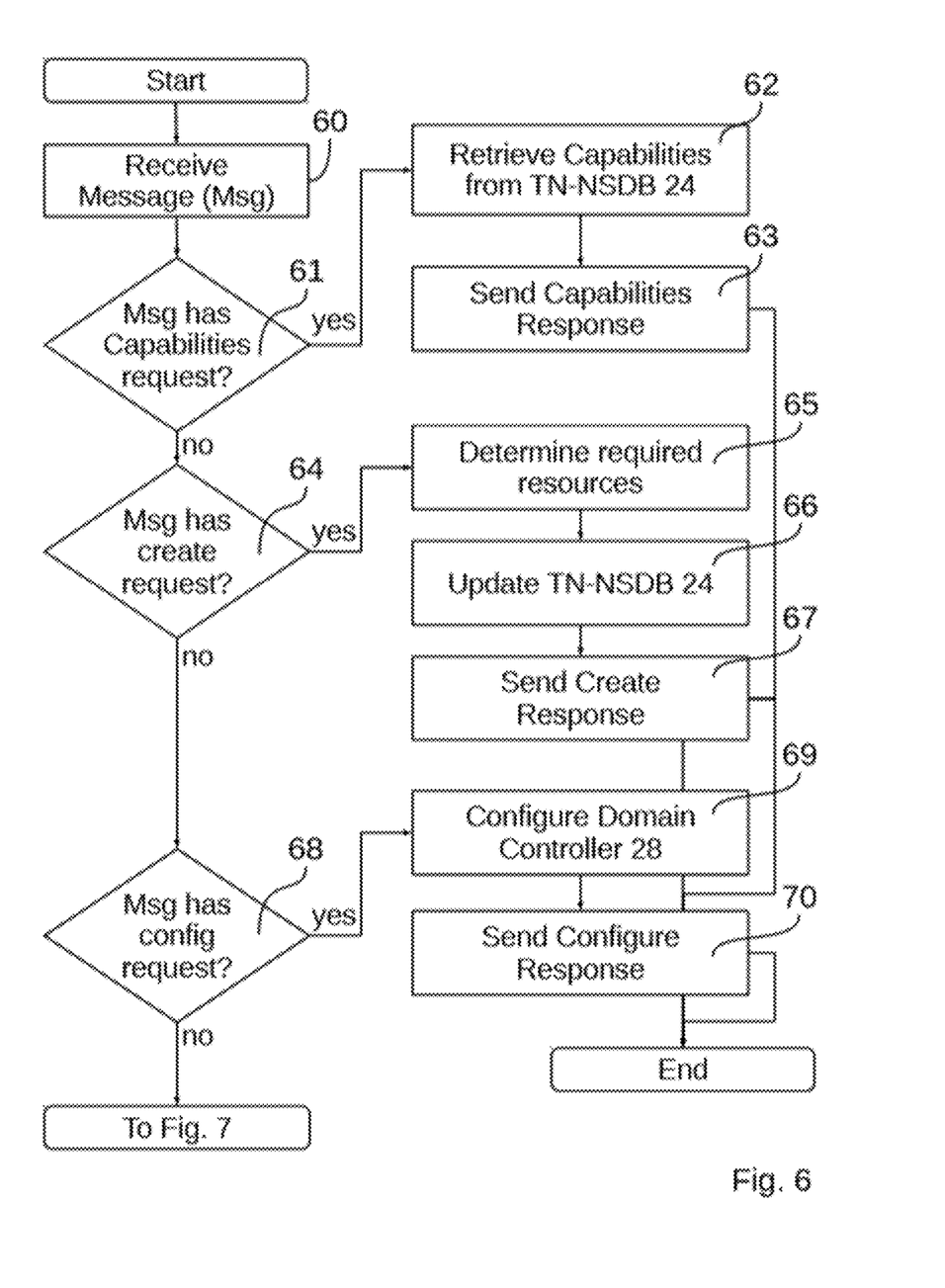
FIG. 6 shows a first section of a flow diagram for an embodiment.
Figure 7:
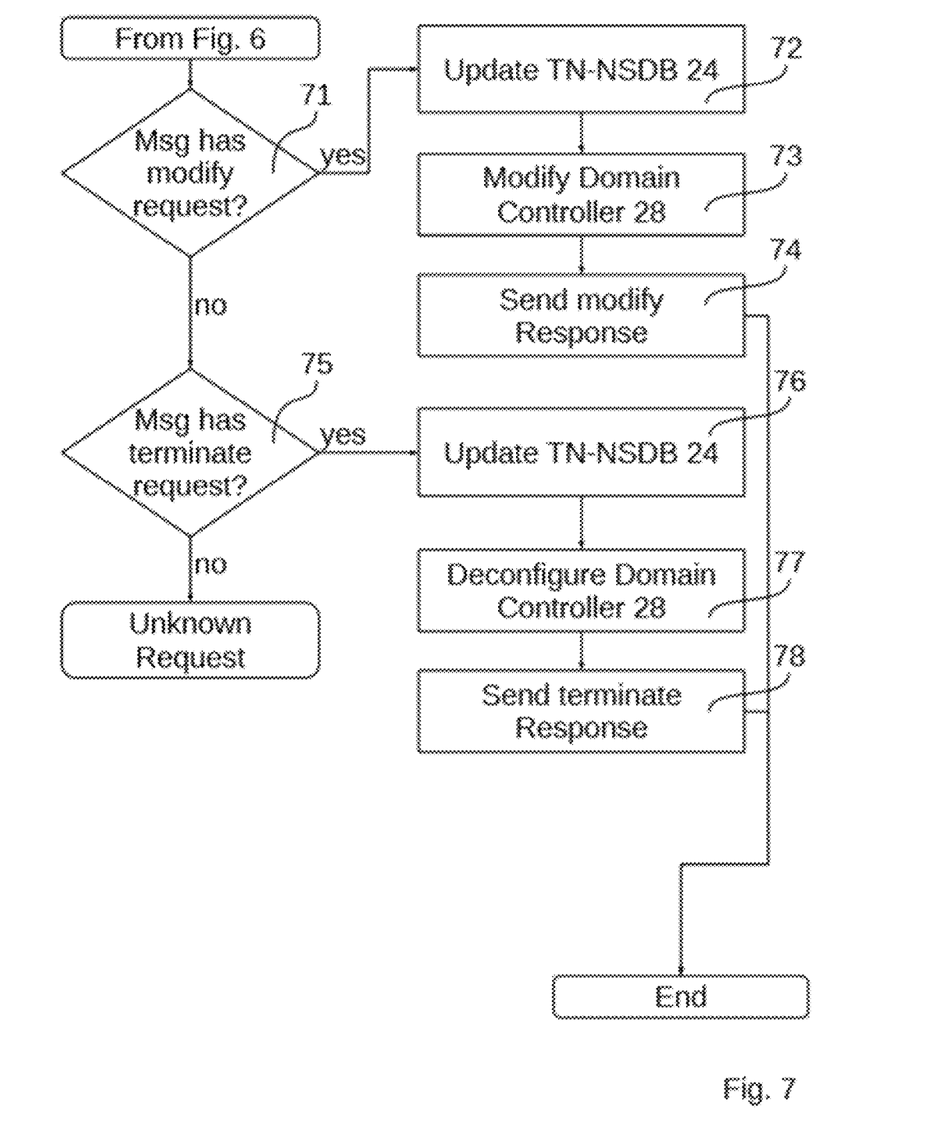
FIG. 7 shows a second section of the flow diagram according to FIG. 6.

The embodiment shown in FIGS. 6 and 7 provides an example method for receiving and handling a message over the MTNSI 22 which may be implemented in the transport network slice subset management entity 20.

In a first step 60, the transport network slice subset management entity 20 receives a message. This message comprises a request and originates from a request originator, for example the NSMF 12.

In a step 61, it is determined whether the message comprises a capabilities request, similar to msg_15a according to FIG. 4. A capabilities request may be an information request, requesting at least one of the following: topology information, performance information, the functions information or a security or policy information. The capabilities request may be directed at different information than mentioned here. In a step 62, the transport network slice subset management entity 20 retrieves the capabilities or information that were requested from the transport network network slice database 24. In a step 63, the transport network slice subset management entity 20 then sends a response message comprising the requested capabilities information to the message originator, similar to msg_15b according to FIG. 4.

In a step 64, it is determined whether the message comprises a create request, similar to msg_1a according to FIG. 4. A create request may relate to a network subset slice and may comprise a description of the resources requested. In a step 65, a type and/or a quantity of resources required to execute the create request is determined. In a step 66, the transport network network slice database 24 is updated. This update may comprise an edition of the determined type and/or quantity of resources to the network slice database, in particular by marking these resources as reserved for a particular network slice and/or network subset slice. In a step 67, the message is sent to the message originator comprising a response to the create request, similar to msg_1b according to FIG. 4.

In step 68, it is determined whether the message comprises a configure request, similar to msg_2a according to FIG. 4. In step 69, the domain controller 28 is configured according to the configure request. The information about how the domain controller 28 is to be configured may be retrieved from the transport network network slice database 24 in a further step. Once the domain controller 28 has been configured, a configure response message is sent back to the originator in step 70, similar to msg_2b according to FIG. 4.

In step 71 (see FIG. 7), it is determined whether the message comprises a modification request, similar to msg_3a according to FIG. 4. A modification request may, for example, comprise allocation and/or deallocation of resources. If the message comprises a modification request, the transport network network slice database 24 is updated in step 72 with the modified resources. In step 73, the domain controller 28 is modified according to the modification request. Of course, the steps 72 and 73 are not necessarily executed in this order. In a step 74, a modified response message is sent back to the message originator, similar to msg_3b according to FIG. 4.

If the message did not comprise a modification request, in step 75, it is determined whether the message comprises a termination request, similar to msg_6a according to FIG. 4. A termination request may also be implemented as a request for the deallocation of resources. In step 76, which is executed if the message comprises a terminate request, the transport network network slice database 24 is updated according to the termination request. In a step 77, the domain controller 28 is deconfigured. In a step 78, a terminate response is sent in the message to the message originator, similar to msg_6b according to FIG. 4.

While this method has been described as an exchange of messages comprising requests, any method of communication that can provide the requests to the transport network slice subset management entity 20 can be used instead of the messages proposed.

The methods, functions processes and entities described above may also be implemented as a computer program running on an appropriate computing device or processor.

The drawings and the foregoing description are to be considered illustrative or exemplary and not restrictive.

Modifications may involve other features, which are already known in the art and may be used instead of or in addition to features already described herein.

Other variations to the disclosed embodiments can be understood and effected by those skilled in the art from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

REFERENCES 10 wireless network
12 network slice management entity, network slice management function, NSMF
14 communication service management function, CSMF
16 network slice subset management function of the radio access network, RAN-NSSMF
18 network slice subset management function of the core network, core-NSSMF
20 transport network network slice subset management entity, transport network network slice subset management function, TN-NSSMF
22 mobile transport network slice interface, MTNSI
24 transport network network slice database, TN-NSDB
26 network slice information database, NSI-DB
28 domain controller (of the Transport Network)
30 transport network environment
32 transport network network slice sub-network instance, TN-NSSI

What is claimed is:

1. A transport network slice subset management entity comprising:
    a memory configured to store instructions; and
    a processor coupled to the memory and configured to execute the instructions to:
        provide a network slice subset management function of a transport network;
        manage a transport network network slice subnet instance (TN-NSSI);
        communicate messages with a network slice management entity, wherein the messages are associated with the TN-NSSI; and
        provide configuration information to entities of the transport network,
        wherein the configuration information is associated with the TN-NS SI.

2. The transport network slice subset management entity of claim 1, wherein the configuration information comprises capabilities exposure information of the transport network to the network slice management entity.

3. The transport network slice subset management entity of claim 1, wherein the processor is further configured to execute the instructions to:
    store information relating to network slice instances; and
    provide the information.

4. The transport network slice subset management entity of claim 1, further comprising a storage device configured to store information about at least one of the following properties of the transport network: a capability, a topology, a security policy, or a performance parameter.

5. The transport network slice subset management entity of claim 4, wherein the topology comprises at least one of a link, a node, an interface, a network, or a value added service function.

6. The transport network slice subset management entity of claim 1, wherein the configuration information comprises slice configuration information.

7. The transport network slice subset management entity of claim 1, wherein the configuration information comprises life-cycle management information.

8. The transport network slice subset management entity of claim 1, further comprising a network function virtualization orchestration function.

9. The transport network slice subset management entity of claim 8, wherein the processor is further configured to execute the instructions to further manage the TN-NSSI to meet a requirement of a virtual link or a physical link in the TN-NSSI.

10. The transport network slice subset management entity of claim 1, wherein the messages comprise a first message related to at least one of:
    TN-NSSI life cycle management;
    TN-NSSI state transition;
    TN-NSSI monitoring-supervising;
    transport network capability exposure;
    error handling and fault management; or
    connection management.

11. A method implemented by a transport network slice subset management entity and comprising:
    providing a network slice subset management function of a transport network;
    managing a transport network network slice subnet instance (TN-NSSI);
    communicating messages with a network slice management entity, wherein the messages are associated with the TN-NSSI; and
    providing configuration information to entities of the transport network,
    wherein the configuration information is associated with the TN-NS SI.

12. The method of claim 11, wherein the transport network slice subset management entity comprises a network function virtualization orchestration function.

13. The method of claim 11, further comprising further managing the TN-NSSI to meet a requirement of a virtual link or a physical link in the TN-NSSI.

14. The method of claim 11, wherein the messages comprise a first message related to at least one of:
    TN-NSSI life cycle management;
    TN-NSSI state transition;
    TN-NSSI monitoring-supervising;
    transport network capability exposure;
    error handling and fault management; or
    connection management.

15. The method of claim 11, wherein the configuration information comprises capabilities exposure information of the transport network to the network slice management entity.

16. The method of claim 11, wherein the configuration information comprises slice configuration information.

17. The method of claim 11, wherein the configuration information comprises life-cycle management information.

18. A network slice management entity comprising:
a database configured to store and provide network management information based on capabilities of a transport network; and
a processor coupled to the database and configured to:
provide a network slice management function;
manage a transport network network slice subnet instance (TN-NSSI); and
retrieve capabilities information from messages from a transport network slice subset management entity, wherein the messages are associated with the TN-NS SI.

19. The network slice management entity of claim 18, further comprising a network slice instance database configured to store and provide information for network slice instances.

20. A network management system comprising:
a transport network slice subset management entity configured to:
manage a transport network network slice subnet instance (TN-NSSI);
communicate messages with a network slice management entity, wherein the messages are associated with the TN-NSSI; and
provide configuration information to entities of a transport network,
wherein the configuration information is associated with the TN-NS SI.

21. The network management system of claim 20, wherein the transport network slice subset management entity is further configured to receive, from a request originator, a message comprising a request relating to a network slice subset instance.

22. The network management system of claim 21, wherein the transport network slice subset management entity is further configured to update a network slice database of the transport network according to the request.

23. The network management system of claim 22, wherein the transport network slice subset management entity is further configured to configure an entity of the transport network according to the request.

* * * * *